US012716731B2

(12) United States Patent
Linder

(10) Patent No.: US 12,716,731 B2
(45) Date of Patent: Aug. 25, 2026

(54) SYSTEM AND METHOD FOR ROUTE MATCHING

(71) Applicant: Allstate Insurance Company, Northbrook, IL (US)

(72) Inventor: Eric M. Linder, Downers Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/617,281

(22) Filed: Mar. 26, 2024

(65) Prior Publication Data

US 2025/0305839 A1 Oct. 2, 2025

(51) Int. Cl.
*G01C 21/34* (2006.01)

(52) U.S. Cl.
CPC ................................ *G01C 21/3446* (2013.01)

(58) Field of Classification Search
CPC ...... G01C 21/3446; G01C 21/30; G06N 3/02; G06N 3/08
See application file for complete search history.

(56) References Cited

U.S. PATENT DOCUMENTS

2018/0335307 A1 11/2018 Chen et al.
2023/0065414 A1* 3/2023 Ariannezhad ...... G01C 21/3461
2023/0080319 A1 3/2023 Zhang et al.

FOREIGN PATENT DOCUMENTS

CN 113834490 12/2021
WO 2020107441 6/2020

OTHER PUBLICATIONS

International Search Report and Written Opinion, PCT/US2025/021360, Jun. 30, 2025.

* cited by examiner

*Primary Examiner* — Ryan Rink

(57) ABSTRACT

Implementations claimed and described herein provide systems and methods for map routing matching system, wherein the one or more machine-learning models scores link candidates of location data points to determine a most probable route. In one implementation, use a machine-learning model to calculate a probability score for a plurality of link candidates. The machine-learning model scores each link candidates based on weighting set by training data, wherein the weighting associated with at least one of travel time, match distance, heading difference, speed conformity, road curvature, road classification, or travel distance versus time delay. A plurality of total probability scores derived from one or more combinations of probability scores for respective link candidates is calculated, wherein one link candidate is selected for each location data point.

18 Claims, 6 Drawing Sheets

SYSTEM AND METHOD FOR ROUTE MATCHING

FIELD

Aspects of the presently disclosed technology relate generally to map matching based on matching raw location data points to a digital map to determine position and trajectory of a moving object.

BACKGROUND

Map matching processes may use geographic information systems (GISs), navigation systems, and location-based services to match a sequence of raw location data points (such as GPS coordinates) to a digital map. Raw location data can be noisy, inaccurate, or imprecise due to various factors such as GPS signal fluctuations, reflection, interference, and environmental conditions. With these observations in mind, among others, various aspects of the present disclosure were conceived and developed.

SUMMARY

Implementations described and claimed herein address the foregoing by providing systems and methods for route matching.

In some implementations, a sequence of location data points associated with respective timestamps of a moving object may be received. A plurality of link candidates selected from a threshold distance of each location data point may be selected. At least one of the machine-learning models may be used to calculate a probability score for each link candidate of the plurality of link candidates of each location data point, wherein the machine-learning model scores each link candidate based on weighting set by training data, wherein the weighting is associated with at least one of travel time, match distance, heading difference, speed conformity, road curvature, road classification, or travel distance versus time delay. A total probability score derived from one or more combinations of probability scores for each link candidate may be calculated, wherein one link candidate is selected for each location data point. A most probable route based on a highest total probability score may be generated.

In some implementations, the calculated total probability scores may be reevaluated for each location data point based on contextual data and considering links associated with timestamps at least three location data points ahead and behind each respective timestamp. Timestamps between the considered timestamp and a respective timestamp of a respective location data point may be skipped over, and the most probable total score may be derived from the reevaluated calculated scores. At least one of the machine-learning models may be trained based on real-world position data associated with ground truth data including evaluated links associated with the real-world position data and at least one of respective travel time, respective match distance, respective heading difference, respective speed conformity, respective average curvature, respective functional class, or respective travel distance versus time delay.

In some implementations, at least one of the machine-learning models may be used to calculate a transition score between neighboring link candidates of the respective link candidates, wherein each transition is scored based on transition weighting set by transition training data, wherein the transition weighting is associated with a transition that shares a node, a transition that does not share a node, or a transition on a same link. The location data points may be based on respective vehicle movement data captured from one or more telematics sensors. In some implementations, instructions to change a user score based on the most probable route that indicates that that an associated driver moved in an illegal manner may sent.

In some implementations, a visual representation of the most probable route with interactive aspects that provide insight into each respective link may be generated. An indication to change one of the links to another link candidate associated with the respective timestamp may be received. The machine-learning model may be retrained based on the most probable route with the changed link candidate and the respective timestamp. In some implementations, one or more link candidates may be removed from the plurality of link candidates that are associated with a speed less than a threshold speed amount. In some implementations, one or more link candidates may be removed from the plurality of link candidates that are associated with a direction that does not match with neighboring link candidates. In some implementations, the machine-learning models may calculate the probability scores using matrix multiplication.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed descriptions are to be regarded as illustrative in nature and not limiting.

DETAILED DESCRIPTION

Figure 1:
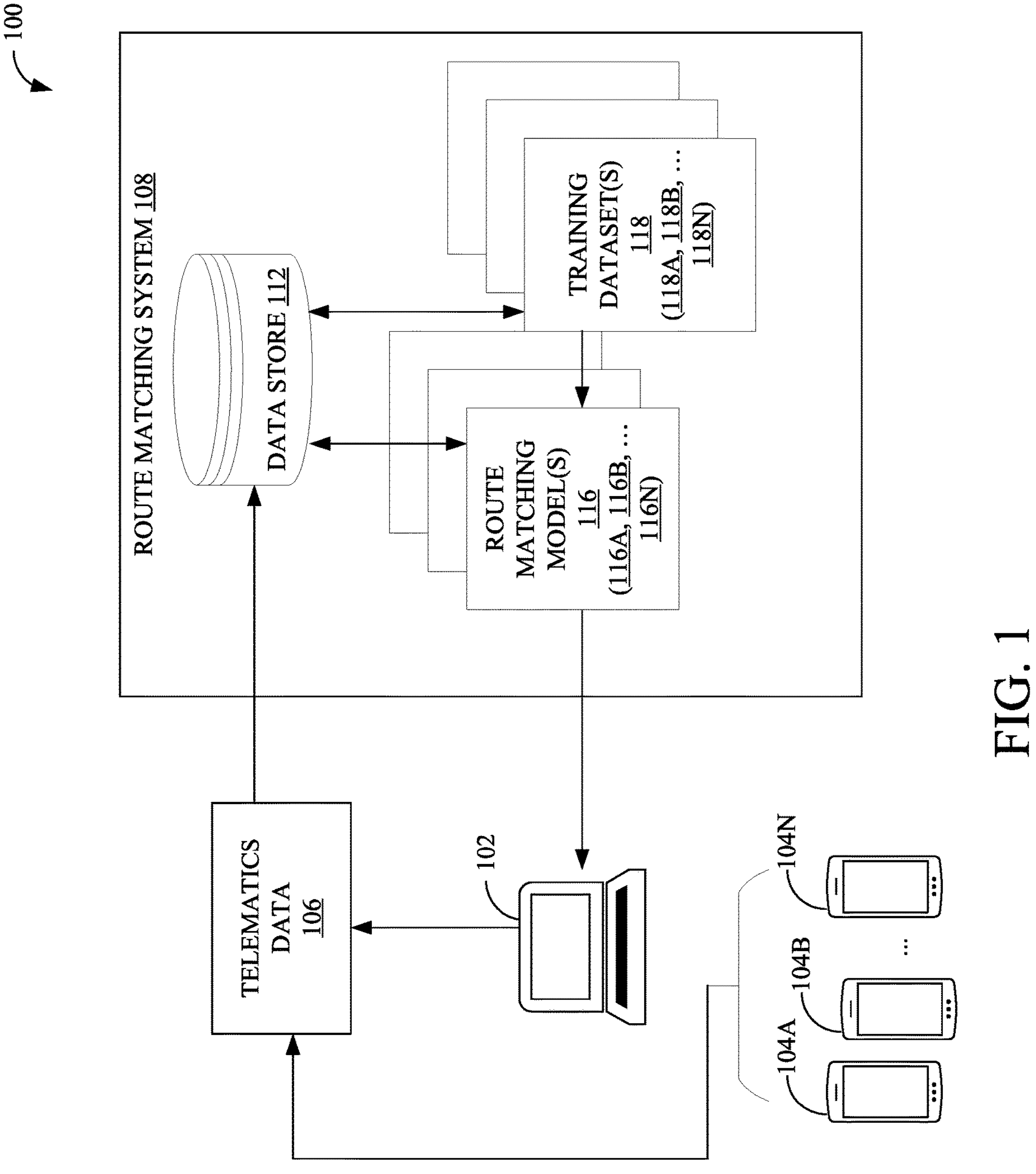
FIG. 1 illustrates an example network environment showing a route matching system for scoring link candidates of location data points to determine a most probable route, in accordance with some aspects of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

Disclosed are systems, apparatuses, methods, non-transitory computer-readable media, and circuits for route matching that uses a multi-criteria scoring system to score potential route segments. By using piecewise linear road network data, every road is split up into links and every link is split up into segments. As such, segments may be end points or may be shape points of a particular road. Furthermore, multiple timestamps ahead and behind a current point may be considered. In addition, context may be extended to include a broader temporal view. Temporal considerations may be seamlessly integrated into the scoring process and point match selection. Potential match candidates with a threshold distance, such as 40 meters, for a single sample point may be considered.

First, there is a distinction between point matching and route matching. Point matching algorithms focus on associating individual data points (such as GPS coordinates) with the nearest corresponding feature on a map. A goal of point matching algorithms is to identify the road segment, node, or landmark that corresponds to a particular location. However, point matching algorithms do not consider the logical flow of movement between points. Point matching algorithms also fail to consider the actual path taken between points, leading to inaccuracies if the path is complex or includes detours. Route matching algorithms go beyond individual point matching and aim to reconstruct the most likely route taken by a moving object (such as a vehicle) based on a sequence of location data points. Route matching algorithms consider the sequential nature of the points and aim to find the best-fitting route on the map that matches the observed movement.

As such, while point matching is primarily concerned with finding the nearest map feature for individual data points, without considering the sequence of points or the path between them, route matching aims to reconstruct the most likely route taken by a moving object by considering the sequence of points and their spatial relationships. The choice between these approaches depends on the specific application and the level of accuracy required. Route matching is more suitable when analyzing movement patterns, navigation, and understanding travel behavior, while point matching might be sufficient for simpler tasks like geotagging or identifying nearby points of interest.

For route matching, each GPS data point of a route is stored with a number of attributes including a timestamp, a speed, and/or a heading. The GPS data points may be designated by a timestamp and the timestamps associated with the data points may be divided into a matrix. For each timestamp, multiple matches for a single point may be generated as potential matches. Each match may be associated with a link (or a road segment). Links may represent a stretch of road between two intersections or between an intersection and a road end. In addition, nodes connect links and may have unique node IDs. In some cases, a Z-level of the node may be incorporated into the node ID.

For example, if a GPS data point has coordinates that are close to both a frontage road and an exit, both are potential matches, and merely use a point matching system with a shortest path approach may not be the most elegant approach.

There may be at least three different types of transitions. A transition where links share a node, a transition where links do not share a node, or it is based on a shared link. In order to score the various potential links, a shortest past determination may be generated that is part of a multi-criteria scoring system to determine different scores. If there are n number of links that have no connectivity, that may be a score. The final score is calculated based on multiplying the various scores of the different ways of connecting the paths. In other words, reasonable links within a threshold distance, such as 40 meters, may be set as potential links associated with a respective timestamp and another set of reasonable links associated with a next time stamp is generated and the various transitions between the various links are scored.

The route matching may be based on scoring potential route segments based on a range of probabilities derived from various features such as: travel time, match distance, heading difference, sped alignment, curvature and function class, and/or travel distance and time delays. With respect to travel time, shorter durations may be favored and travel time may be calculated from a speed category and a length of a link.

According to at least one example, a system comprising one or more processors, a display with a user interface, and a memory unit storing computer-executable instructions, which when executed by the one or more processors, cause the system to score link candidates of location data points to determine a most probable route. A sequence of location data points associated with respective timestamps of a moving object may be received. A plurality of link candidates for each location data point selected from a threshold distance of each respective location data point may be selected. At least one of the machine-learning models may be used to calculate a probability score for the plurality of link candidates, wherein the machine-learning model scores each link candidates based on weighting set by training data, wherein the weighting associated with at least one of travel time, match distance, heading difference, speed conformity, road curvature, road classification, or travel distance versus time delay. A plurality of total probability scores derived from one or more combinations of probability scores for respective link candidates may be calculated, wherein one link candidate is selected for each location data point. A most probable route based on a highest total probability score may be determined.

According to at least one example, the calculated probability scores of the plurality of link candidates may be reevaluated for each location data point based on contextual data and considering links associated with timestamps at least three location data points ahead and behind each respective timestamp. Timestamps between the considered timestamp and a respective timestamp of a respective location data point may be skipped over, and the most probable total score may be derived from the reevaluated calculated scores. At least one of the machine-learning models may be trained based on real-world position data associated with ground truth data including evaluated links associated with the real-world position data and at least one of respective travel time, respective match distance, respective heading difference, respective speed conformity, respective average curvature, respective functional class, or respective travel distance versus time delay.

According to at least one example, at least one of the machine-learning models may be used to calculate a transition score between neighboring link candidates of the link candidates of the one or more combinations of probability scores for respective link candidates, wherein the machine-learning model scores each transition based on transition weighting set by transition training data, wherein the transition weighting are associated with a transition that shares a node, a transition that does not share a node, and a transition on a same link. The location data points may be based on vehicle movement data captured from one or more telematics sensors. In some implementations, instructions to change a user score based on the most probable route that indicates that that an associated driver moved in an illegal manner may sent.

According to at least one example, a visual representation of the most probable route with interactive aspects that provide insight into each respective link may be generated. An indication to change one of the links to another link candidate associated with the respective timestamp may be received. The machine-learning model may be retrained based on the most probable route with the changed link candidate and the respective timestamp. In some implementations, one or more link candidates may be removed from the plurality of link candidates that are associated with a speed less than a threshold speed amount. In some implementations, one or more link candidates may be removed from the plurality of link candidates that are associated with a direction that does not match with neighboring link candidates. In some implementations, the machine-learning models may calculate the probability scores using matrix multiplication.

To begin, FIG. 1 illustrates an example network environment 100 showing a route matching system 108 for scoring link candidates of location data points to determine a most probable route, in accordance with some aspects of the present technology. A device 102, such as a mobile device or some other form of telematics device, may collect telematics data 106. Telematics data 106 may be collected from a global position system (GPS), micro-electro-mechanical system (MEMS) sensors, and other data logging tools. The telematics data 106 captured can include location, speed, idling time, harsh acceleration or braking, vehicle faults, and more.

The telematics data 106 may be sent to the route matching system 108 to ultimately output determined closest road segments or nodes that collectively create a predicted route taken by the moving object. The route matching system 108 may comprise a remote processor, partially comprise the remote processor and use one or more processors on the device 102, or fully determine the prediction on one or more processors on the device 102. If the route matching system 108 is remote, data sent to and from a mobile application may be via an application programming interface (API).

Figure 2:
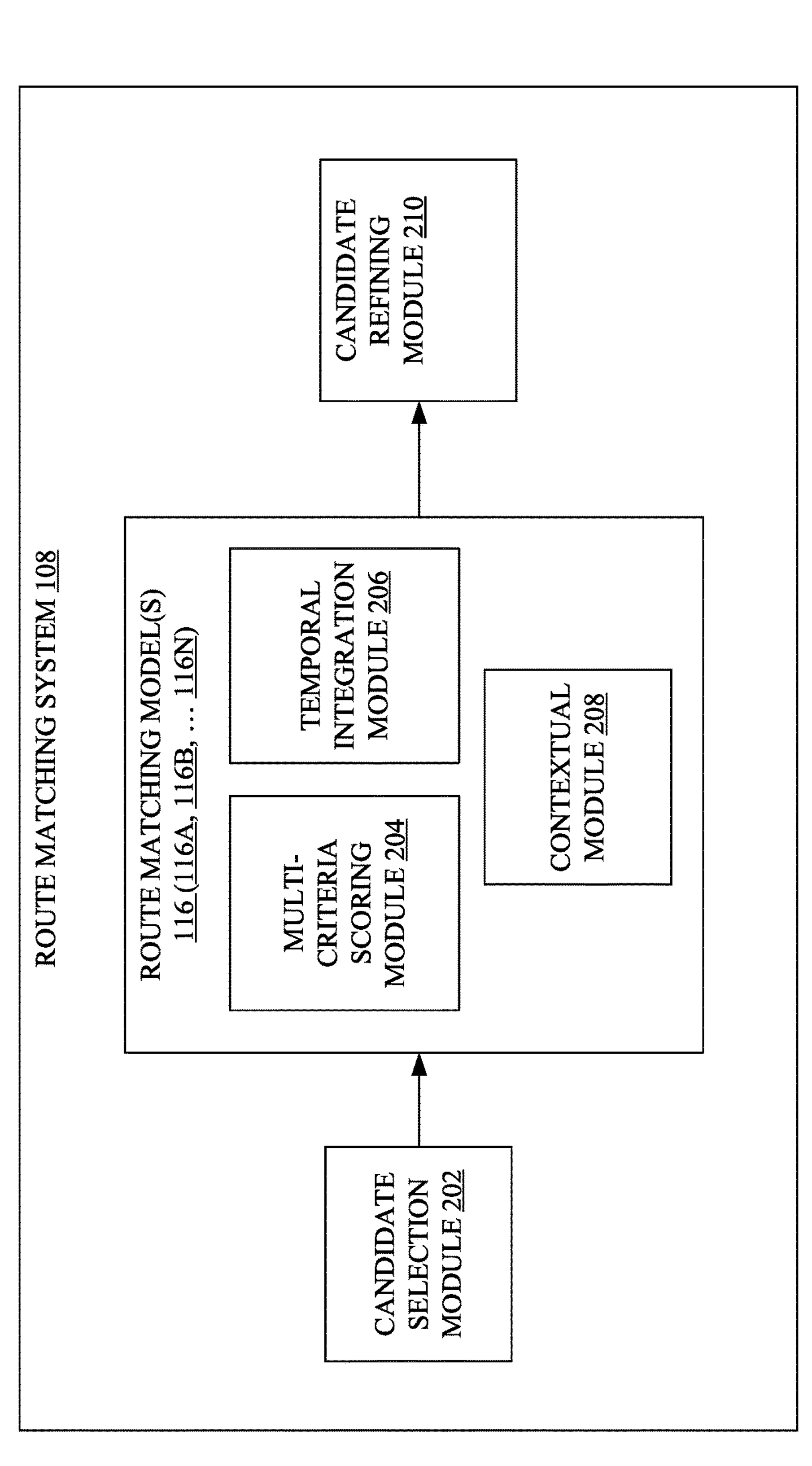
FIG. 2 illustrates an example system shows various example modules of the route matching system 108, in accordance with some aspects of the present technology.

The telematics data 106, which may include at least one of global positioning system (GPS) speed variables, GPS altitude variables, and accelerometer magnitude variables, may be stored at a data store 112 or at the device 102. In some cases, one or more route matching models 116 (116A, 116B, . . . 116N) may include one or more machine-learning models and/or be a part of a convolutional neural network (CNN) of the route matching system 108. In some cases, the route matching model(s) 116 may include various sub-modules that further refine the route matching process. As shown in FIG. 2, the route matching system 108 may include a candidate selection module 202, the route matching model (s) 116, which may include a multi-criteria-scoring module 204, a temporal integration module 206, and a contextual module 208, and a candidate refining module 210. The different modules may use different machine-learning algorithms to refine a prediction of a route segment or node. In some cases, the route matching model(s) 116 may receive the telematics data 106 from the data store.

As an example, the route matching model(s) 116 may translate real-world agent-based position data from the telematics data 106 into weighting associated with generating a score associated with route segments or nodes. The scores may be associated with a likelihood of whether or not a particular route segment or node is a likely next route segment or node for a predicted route.

Turning to FIG. 2, an example system 200 shows various example modules of the route matching system 108, in accordance with some aspects of the present technology.

As mentioned, the route matching system 108 may include a candidate selection module 202. In some cases, the candidate selection module 202 selects potential link candidates within a threshold distance, such as 40 meters, for a raw data point. Each potential link candidate may then be evaluated based on a multi-criteria-scoring module 204. As previously mentioned, each potential link candidate may be associated with a link (or a road segment). Links may represent a stretch of road between two intersections or between an intersection and a road end. In addition, nodes connect links and may have unique node IDs.

As mentioned, the route matching system 108 may include a multi-criteria-scoring module 204. The multi-criteria-scoring module 204 may score the potential link candidates and may assign scores to potential route candidates based on a range of probabilities derived from various features. For example, the multi-criteria-scoring module 204 may consider travel time, such that travel time may be calculated from a speed category and a length of the potential link candidate, favoring shorter durations. In some cases, the multi-criteria-scoring module 204 may consider a match distance, considering the distance between the raw data point and the projected point on the potential link candidate.

In some cases, the multi-criteria-scoring module 204 may consider heading difference, wherein alignment between the raw data point's heading and the potential link candidate's direction may be measured. In some cases, the multi-criteria-scoring module 204 may consider speed alignment, wherein the speed associated with the raw data point may be compared with the speed limit of the potential link candidate. In some cases, the multi-criteria-scoring module 204 may consider curvature and functional class and may prioritize straighter paths and accounts for a road's classification. In some cases, the multi-criteria-scoring module 204 may consider travel distance and/or time delay, where unreasonable travel distances may be identified and mitigated for given timestamps.

In some cases, the multi-criteria-scoring module 204 may also take travel times into account as well as the actual speeds on different road segments. By considering travel time and actual speed, the multi-criteria-scoring module 204 may generate a more accurate representation of the route taken, by considering factors like traffic congestion, road conditions, and speed limits. In some cases, travel times can adapt to changes in road conditions, such as traffic jams or accidents, resulting in more accurate route reconstruction in real-world scenarios. In some cases, considering travel time and actual speed reflects the driving behavior, such that travel times inherently capture the variations in driving speeds that occur due to factors like road types, intersections, and urban versus rural areas.

As mentioned, the route matching system 108 may include a temporal integration module 206. In route matching, considering multiple timestamps in a lookahead and lookbehind process may enhance the accuracy of the matched route. The lookahead and lookbehind process helps account for dynamic road conditions, travel times, and possible route changes over time. Including a lookahead and lookbehind process approach is particularly crucial in scenarios involving complex road networks, limited entry and exit points, and the possibility of missing key turns or exits.

For example, with a divided highway with an express lane that has limited entry and exit points, such a scenario involves a situation where a vehicle enters the highway and has the option to enter the express lane at a future point. The express lane is divided by a barrier that restricts the exits back to the main highway. However, an exit from the main highway is missed when the vehicle is in the express lane due to the limited exit options.

For example, in the scenario, a vehicle may enter the main highway, the vehicle may have the option to enter the express lane, and dividers may enforce the limited exits from the express lane. As such, ambiguous points occur while the vehicle is approaching the express lane. The express lane may be selected, and the vehicle must continue in the express lane until a further exit opportunity arises. An exit from the highway may be missed if the express lane is chosen as the match. In such a scenario, multi-timestamp lookahead and lookbehind are crucial.

For looking ahead, when considering future points, the temporal integration module 206 may consider the limited exit options from the express lane. In some cases, the temporal integration module 206 may include a machine-learning model that may correct a score for a match if, for example, the potential link candidate matches the vehicle to the express lane based only on its current characteristics (heading, speed) but it did not anticipate the limited exit opportunities and the possibility of missing the intended exit.

For looking behind, it is important to understand the sequence of decisions and actions that led to the current point. Following the same example, the temporal integration module 206 may help recognize that the vehicle had the chance to exit the main highway before entering the express lane, and that the missed exit was a result of choosing the express lane.

In some cases, if the route matching model 116 incorrectly matches the vehicle to the express lane and misses the context of limited exits, the matched route might show the vehicle staying in the express lane without accounting for the missed exit. Furthermore, there may be a long stretch of the route with no match points because the algorithm is assuming the vehicle continues smoothly in the express lane without considering the necessary transition back to the main highway. As such, the travel time allocations would be inaccurate because the algorithm is not accounting for the missed exit and the resulting delay due to the need to continue in the express lane.

Therefore, by considering multi-timestamp look ahead and look behind, the route matching model 116 may avoid matching the vehicle to the express lane and missing the exit from the main highway. This would result in a more accurate and logical route representation that captures the otherwise missed exit, the unneeded action of continuing in the express lane, and the erroneous resulting longer match. This approach ensures that the matched route reflects the actual decisions and actions taken by the vehicle within the context of the road network's limitations.

In some cases, the route matching model 116 may select a suboptimal match point with a lower score to ensure that the overall trip trajectory makes more logical sense. This is done to avoid introducing abrupt changes in direction, unlikely transitions, or other inconsistencies in the matched route. For example, if a suboptimal match on a road with a slightly lower score maintains a smoother overall route trajectory and adheres to known travel time allocations, it might be favored over a higher-score candidate that would introduce unrealistic route deviations or sudden changes in direction.

For example, a GPS-tracked vehicle may be moving along a highway, and there may be frontage roads and ramps parallel to the highway. The frontage roads and ramps may have similar heading, speed, and distance to the current point, making them high-scoring candidates in a basic point-to-road match. However, when considering travel times, timestamps, and the logical flow of the trip, a more holistic picture is presented. In such a case, the candidate frontage road or ramp matches may lead to travel times that are much longer than the actual highway travel times due to speed limits and traffic conditions. When looking ahead and behind, it becomes evident that there are gaps in travel times and distances for these candidates that would be unrealistic for the vehicle's movement along the highway.

In such a case, even though the frontage roads and ramps might score well individually based on their characteristics, when the travel time constraints and the sequence of points are considered, they are unlikely to be valid matches. Selecting them would lead to a route with significant gaps and inconsistencies, resulting in an unrealistic trajectory.

As such, when matches are made based solely on highly scored points without considering travel times, logical sequence, or the trip's anticipated route, the resulting route might exhibit long sections with no match points. These gaps occur because the selected points fail to accurately capture the true movement of the vehicle and the logical transitions between road segments.

These gaps can lead to unrealistic trajectories, inaccurate travel time calculations, and nonsensical routes. By incorporating look ahead, look behind, travel times, and logical sequence, route matching system 108 may create a more coherent and representative route that accurately reflects the actual path taken by the vehicle, by ensuring that the matched route corresponds more closely to the real-world behavior of the moving object.

The route matching system 108 may include a contextual module 208.

In some cases, incorporating information about restricted driving maneuvers, restricted roadways, and specific driving laws is essential to strike a delicate balance between aiding the matcher in achieving accurate route matches and identifying instances when a driver truly exhibited risky behavior. Contextual factors may play a pivotal role in crafting a nuanced and context-aware map matching solution.

For example, restricted driving maneuvers, such as left turns during specific hours, exemplify the fine line between route matching accuracy and identifying risky behavior. By accounting for these restrictions, the route matching model (s) 116 helps prevent matches that would breach these regulations. This improves the accuracy of route representation, ensuring that matched paths adhere to legal and practical driving norms. While aiding in proper route identification, understanding these maneuvers also aids in pinpointing drivers who consistently flout such restrictions, possibly indicating risky or reckless driving habits.

With respect to restricted roadways, the contextual module 208 may balance accurate route matches and the identification of risky driving behaviors necessitates accurate representation of restricted roadways, like pedestrian-only or emergency vehicles-only zones. Ensuring that route matching algorithms respect these limitations prevents vehicles from being incorrectly matched to prohibited areas. Moreover, observing frequent violations of these restrictions could signify a driver's disregard for safety rules, classifying them as risky road users.

With respect to specific driving laws and behaviors, the contextual module 208 may integrate and further refine scores based on the intricate interplay between route matching accuracy and risk identification may be important when understanding specific driving laws and behaviors. Acknowledging that drivers may avoid certain paths to bypass stoplights underscores the need for realistic route matches. Simultaneously, recognizing such behaviors can lead to identifying drivers who consistently engage in potentially hazardous actions, like making risky shortcuts through parking lots to save time. The contextual module 208 balances accurate route matches with recognizing such patterns enables a comprehensive approach to understanding driving behavior.

For a positive match, the contextual module 208 may incorporate information about restricted maneuvers, roadways, and specific driving behaviors to support the route matching process and yield matches that accurately mirror legal and practical driving patterns. This ensures that mapped routes align with real-world driving behaviors while supporting the correct identification of actual routes taken.

For risk identification, the contextual module 208 may further monitor drivers who repeatedly engage in prohibited maneuvers or traverse restricted zones that may reveal patterns of risky behavior. Aiding in identifying such drivers, who potentially pose a danger to themselves and others, may assist the route matching technology, which may enable timely intervention, training, or corrective actions to enhance road safety.

The integration of knowledge about restricted maneuvers, roadways, and specific driving laws into route matching algorithms presents a dynamic equilibrium between achieving accurate route matches and detecting instances of risky driving behavior. This balanced approach enables route matches to reflect actual driving practices and assists in identifying drivers who consistently display risky conduct on the roads.

In some cases, the contextual module 208 may further integrating auxiliary data and signal characteristics for complex issues that arise at specific geographic features or signal conditions. A successful identification of routes in particular scenarios would increase the adaptability and robustness of route matching algorithms in handling a wide range of real-world challenges.

Patterns of complexity in route matching often emerge in scenarios where traditional point-to-road matching techniques face challenges due to unique geographical or environmental conditions. For example, navigating through tunnels poses a challenge for route matching, given the lack of GPS points within the tunnel itself. However, the entry and exit points along with the speed limit and GPS timestamps provide valuable clues. The transition from open road to tunnel and back, as indicated by sudden changes in speed and GPS accuracy, helps recognize tunnel travel. Incorporating this information, even without continuous points, enhances route matching accuracy by correctly associating the vehicle's trajectory with the tunnel route.

As another example, water crossings with ferries or a roll-on/roll-off (RORO) vessel where bridges may not be present requires a nuanced approach to route matching. For instance, a vehicle entering the water and exiting on the other side might imply the use of a ferry or a roll-on/roll-off (RORO) vessel. Knowing ferry schedules and locations, along with entry and exit times, allows the algorithm to correctly identify a ferry route. This approach prevents matches that could erroneously lead to bridges or alternate routes nearby, resulting in a more precise representation of the journey.

As another example, elevated streets, especially those with underground parking or areas exposed to the sky, can lead to inconsistent GPS point reception. This spotty coverage creates gaps in the data, challenging traditional matching techniques. To address this, algorithms must consider the inherent limitations of GPS accuracy and incorporate multi-timestamp look ahead and look behind. By recognizing the possible areas of signal loss and reconnecting with more stable points, the algorithm accurately identifies the route despite the spotty data.

As another example, for urban canyons with GPS multipaths, navigating through densely built urban areas can lead to signal interference known as GPS multipath. Tall buildings reflect GPS signals, causing inaccuracies in location data. This multipath effect can result in recorded points that deviate from the actual path taken. As such, the route matching model(s) 116 may be made aware of the potential for multipath interference and its impact on accuracy. By considering known building heights, road layouts, and possible multipath-affected segments, the algorithm can make corrections and improve the quality of matched routes, even in challenging urban environments.

In addition, map matching may further encounters complexities due to various challenges in data collection. These challenges include missing data, inaccuracies, and variations in data quality. These complexities can lead to uncertainties when trying to match GPS points to the correct road segments.

Multi-modal trips involve a traveler using different modes of transportation (e.g., walking, driving, biking, public transit) within a single journey. This presents significant complexities in map matching due to the varying speeds, routes, and potential shifts between road types and pedestrian pathways.

As an example, a traveler may use a cellular device to capture GPS points during a trip. The traveler alternates between taking taxis and traversing pedestrian-only pathways when not in the taxis. The route matching model(s) 116 accounts for these changes in modes, ensuring that the correct road segments and pathways are matched to the GPS points. This requires a robust understanding of transportation modes, road networks, and pedestrian pathways.

Another complex situation arises when a traveler rides a bicycle during parts of the trip. The speed of the device may be similar to that of a vehicle. However, the traveler might get off the bicycle and continue on foot, potentially using bicycle-only paths, pedestrian-only paths, or shared paths that accommodate vehicles, bicycles, and pedestrians. The route matching model(s) 116 must accurately determine when the traveler transitions between modes and choose appropriate routes based on the mode and accessibility of paths.

In addition, inaccuracies in GPS data can result from factors like signal loss, interference, or the device's inherent limitations. Route matching model(s) 116 must account for such errors and make informed decisions. Detecting transitions between different modes of transportation is challenging. The algorithm must consider speed, direction changes, time intervals, and context to accurately identify mode shifts.

Multi-modal trips often involve traversing pathways that cater to specific modes, like pedestrian-only walkways, bicycle lanes, or vehicle roads. The algorithm must differentiate between these modes and match to the appropriate paths. Some paths accommodate multiple modes of transportation, making it necessary for the algorithm to understand the traveler's mode and choose the right path segment. Intermodal Hubs: Locations where different modes intersect, like train stations or transportation hubs, require accurate matching to different entrance and exit points.

To address complexities arising from data collection and multi-modal trips, the route matching model(s) 116 may incorporate data quality metrics to weigh the confidence in GPS points. In addition, route matching model(s) 116 may utilize machine learning techniques to identify mode transitions based on patterns and contextual cues. The route matching model(s) 116 may further incorporate detailed multimodal network data that includes road types, pedestrian paths, bicycle lanes, and access points. The route matching model(s) 116 may also implement heuristics that prioritize path segments based on the traveler's mode, speed, and accessibility, as well as consider contextual information like speed limits, road connectivity, and transportation schedules to enhance accuracy.

The route matching system 108 may include a candidate refining module 210. Once the relevant considerations are integrated into the scores of the potential candidate links, the candidate refining module 210 may select a best match to output a most likely route.

Figure 3:
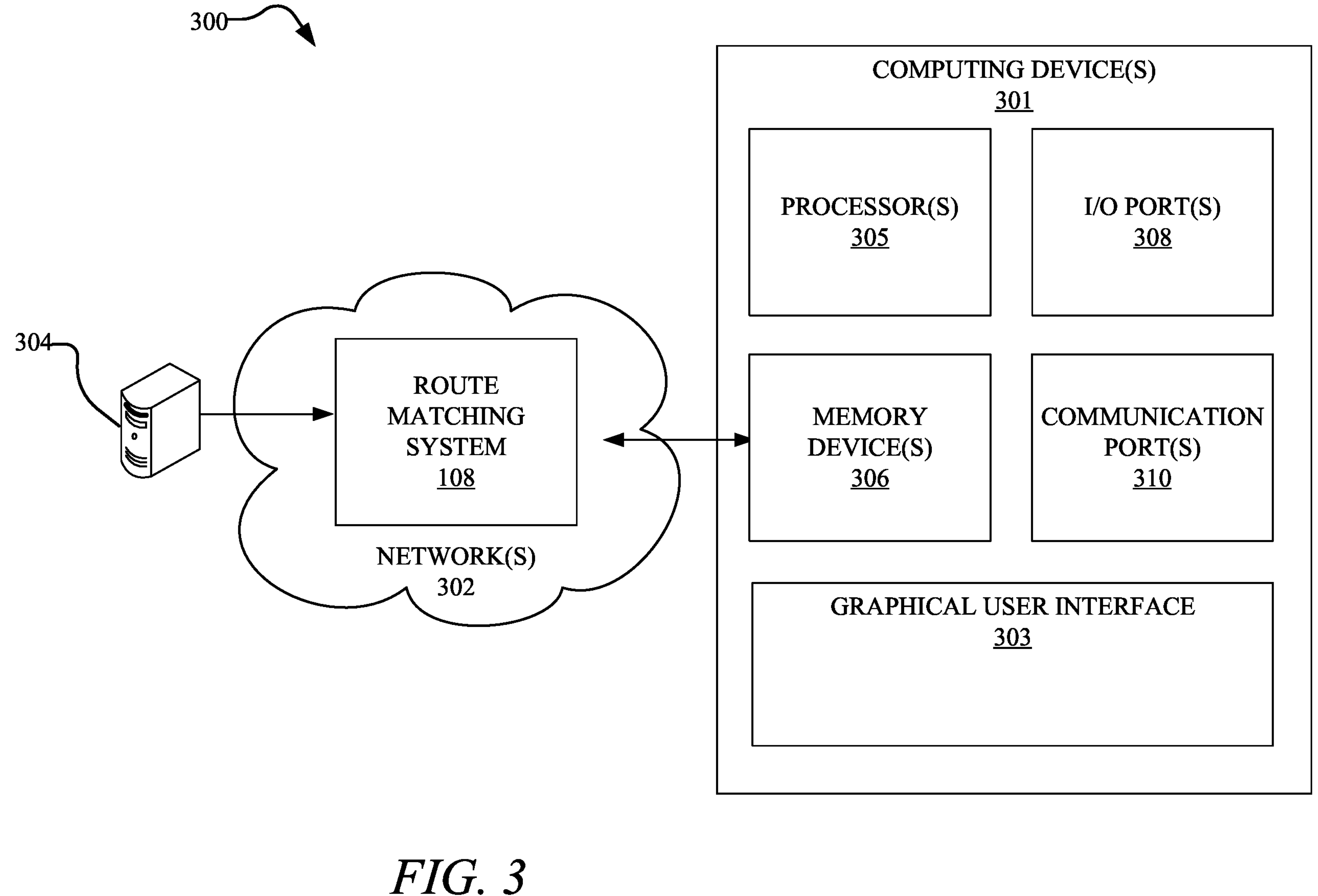
FIG. 3 illustrates an example network environment with one or more computing devices for scoring link candidates of location data points to determine a most probable route in accordance with some aspects of the present technology.

FIG. 3 illustrates an example network environment with one or more computing devices for scoring link candidates of location data points to determine a most probable route in accordance with some aspects of the present technology. The example network environment 300 includes the one or more network(s) 302 which can be a cellular network such as a 3rd Generation Partnership Project (3GPP) network, a third generation (3G) network, a fourth generation (4G) network, a fifth generation (5G) network, a Long-Term Evolution (LTE), an LTE Advanced Network, a Global System for Mobile Communications (GSM) network, a Universal Mobile Telecommunications System (UMTS) network, and the like. Moreover, the network(s) 302 can include any type of network, such as the Internet, an intranet, a Virtual Private Network (VPN), a Voice over Internet Protocol (VOIP) network, a wireless network (e.g., Bluetooth), a cellular network, a satellite network, combinations thereof, etc.

In some cases, the device 102 runs software and/or a software development kit (SDK) that scores link candidates of location data points to determine a most probable route. In some cases, the models and associated logic may be accessed remotely via the cloud and applied on the device 102. A local model may reside on the device 102 in the case the device 102 is offline.

The network(s) 302 provide access to and interactions with systems that scores link candidates of location data points to determine a most probable route. The network(s) 302 can include communications network components such as, but not limited to gateways routers, servers, and registrars, which enable communication across the network(s) 302. In one implementation, the communications network components include multiple ingress/egress routers, which may have one or more ports, in communication with the network(s) 302. Communication via any of the networks can be wired, wireless, or any combination thereof.

The network environment 300 may also include at least one server device 304 hosting software, application(s), websites, and the like for operating the route matching system 108 for scores link candidates of location data points to determine a most probable route. The route matching system 108 can receive inputs from various computing devices and transform the received input data into other unique types of data. The server(s) 304 may be a single server, a plurality of servers with each such server being a physical server or a virtual machine, or a collection of both physical servers and virtual machines.

In another implementation, a cloud hosts one or more components of the systems 100-300. The server(s) 304 may represent an instance among large instances of application servers in a cloud computing environment, a data center, or other computing environment. The server(s) 304 can access data stored at one or more database(s) (e.g., including any of the values or identifiers discussed herein). The systems 100-300, the server(s) 304, and/or other resources connected to the network(s) 302 may access one or more other servers to access other websites, applications, web services interfaces, GUIs, storage devices, APIs, computing devices, or the like to perform the techniques discussed herein. The server(s) can include one or more computing device(s) 301, as discussed in greater detail below.

For instance, the network environment 300 can include the one or more computing device(s) 301 for executing the route matching system 108 and/or scoring link candidates of location data points to determine a most probable route. In one implementation, the one or more computing device(s) 301 include the one or more server device(s) 304 executing the route matching system 108 as a software application and/or a module or algorithmic component of software.

In some instances, the computing device(s) 301 can include a computer, a personal computer, a desktop computer, a laptop computer, a terminal, a workstation, a server device, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, a vehicle (e.g., a smart bicycle, an automobile computer, etc.), and/or the like. The computing device(s) 301 may be integrated with, form a part of, or otherwise be associated with the systems/network environments 100-300. It will be appreciated that specific implementations of these devices may be of differing possible specific computing architectures not all of which are specifically discussed herein but will be understood by those of ordinary skill in the art.

The computing device 301 may be a computing system capable of executing a computer program product to execute a computer process. Data and program files may be input to the computing device 301, which reads the files and executes the programs therein. Some of the elements of the computing device 301 include one or more hardware processors 305, one or more memory devices 306, and/or one or more ports, such as input/output (IO) port(s) 308 and communication port(s) 310. Additionally, other elements that will be recognized by those skilled in the art may be included in the computing device 301 but are not explicitly depicted in FIG. 1 or discussed further herein. Various elements of the computing device 301 may communicate with one another by way of the communication port(s) 310 and/or one or more communication buses, point-to-point communication paths, or other communication means.

The processor 305 may include, for example, a central processing unit (CPU), a microprocessor, a microcontroller, a digital signal processor (DSP), and/or one or more internal levels of cache. There may be one or more processors 305, such that the processor 305 comprises a single central-processing unit, or a plurality of processing units capable of executing instructions and performing operations in parallel with each other, commonly referred to as a parallel processing environment.

The computing device 301 may be a conventional computer, a distributed computer, or any other type of computer, such as one or more external computers made available via a cloud computing architecture. The presently described technology is optionally implemented in software stored on the data storage device(s) such as the memory device(s) 306, and/or communicated via one or more of the I/O port(s) 308 and the communication port(s) 310, thereby transforming the computing device 301 in FIG. 3 to a special purpose machine for implementing the operations described herein and generating a prediction for a likelihood of a collision based on a respective collision prediction algorithm for a particular type of impact. Moreover, the computing device 301, as implemented in the systems 100-300, receives various types of input data (e.g., in different data formats) and transforms the input data through the stages of the data flow described herein into new types of data files (e.g., link candidate stores of location data points to determine a most probable route). Moreover, these new data files are transformed to enable the computing device 301 to do something it could not do before-generate the route matching models 116.

The one or more memory device(s) 306 may include any non-volatile data storage device capable of storing data generated or employed within the computing device 301, such as computer executable instructions for performing a computer process, which may include instructions of both application programs and an operating system (OS) that manages the various components of the computing device 301. The memory device(s) 306 may include, without limitation, magnetic disk drives, optical disk drives, solid state drives (SSDs), flash drives, and the like. The memory device(s) 306 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 306 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 306 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing device 301 includes one or more ports, such as the I/O port(s) 308 and the communication port(s) 310, for communicating with other computing or network devices. It will be appreciated that the I/O port 308 and the communication port 310 may be combined or separate and that more or fewer ports may be included in the computing device 301.

The I/O port 308 may be connected to an I/O device, or other device, by which information is input to or output from the computing device 301. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 301 via the I/O port 308. Similarly, the output devices may convert electrical signals received from the computing device 301 via the I/O port 308 into signals that may be sensed as output by a human, such as sound, light, and/or touch. The input device may be an alphanumeric input device, including alphanumeric and other keys for communicating information and/or command selections to the processor 305 via the I/O port 308. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, the communication port 310 is connected to the network 302 so the computing device 301 can receive network data useful in executing the methods and systems set out herein as well as transmitting information and network configuration changes determined thereby. Stated differently, the communication port 310 connects the computing device 301 to one or more communication interface devices configured to transmit and/or receive information between the computing device 301 and other devices (e.g., network devices of the network(s) 302) by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via the communication port 310 to communicate with one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, the communication port 310 may communicate with an antenna or other link for electromagnetic signal transmission and/or reception.

In an example, the route matching system 108 and/or other software, modules, services, and operations discussed herein may be embodied by instructions stored on the memory devices 306 and executed by the processor 305.

The system 300 set forth in FIG. 3 is but one possible example of a computing device 301 or computer system that may be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 301.

Figure 4:
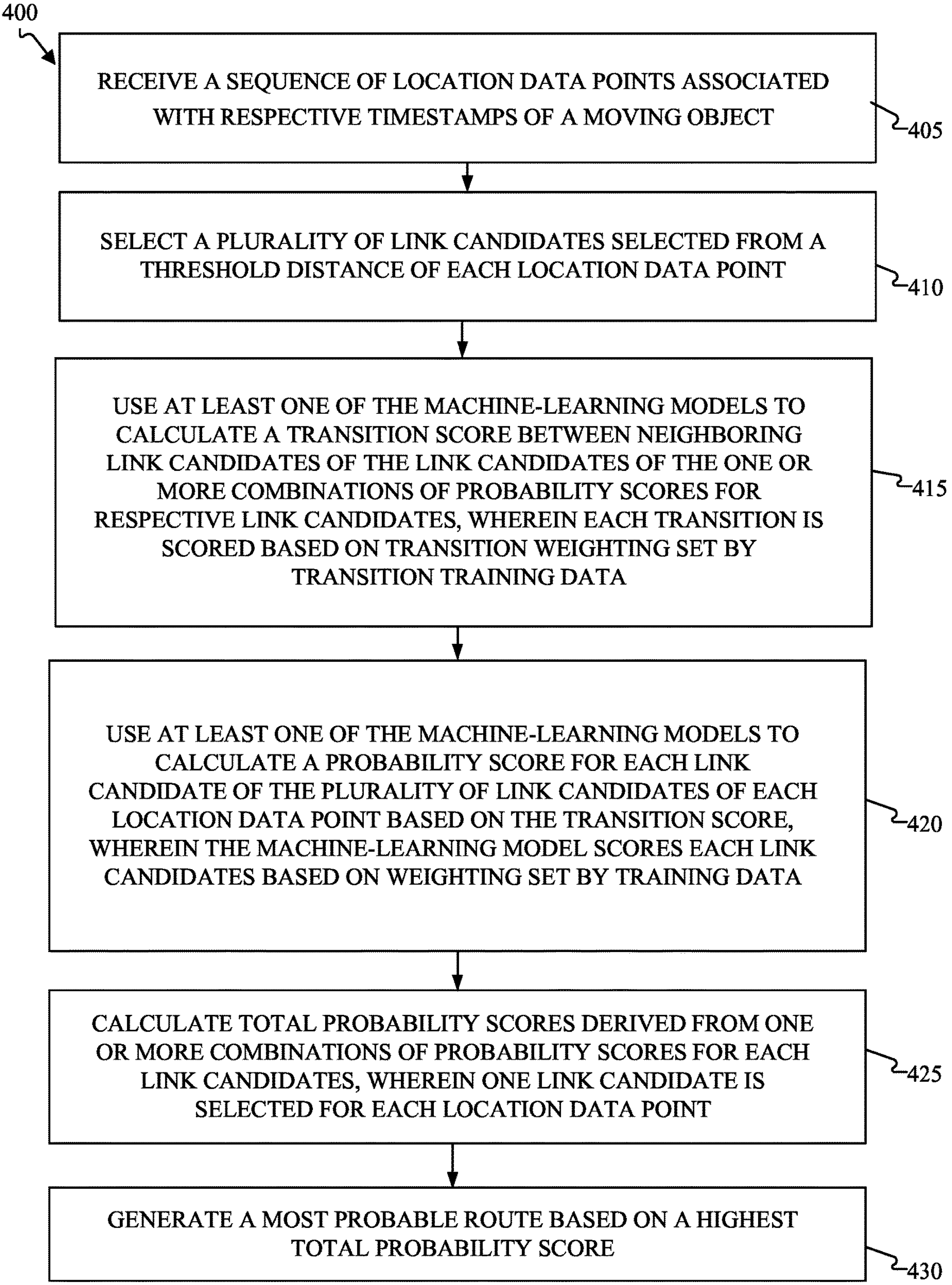
FIG. 4 illustrates example operations for scoring link candidates of location data points to determine a most probable route, in accordance with some aspects of the present technology.

FIG. 4 illustrates example operations for scoring link candidates of location data points to determine a most probable route, which can be performed by any of the systems/network environments 100, 300.

In operation 405, method 400 receives a sequence of location data points associated with respective timestamps of a moving object. In some cases, the location data points are based on vehicle movement data captured from one or more telematics sensors. In operation 410, method 400 selects a plurality of link candidates selected from a threshold distance of each location data point. In some cases, the threshold distance is 40 meters and any link within 40 meters of each location data may be selected as a link candidate.

In some cases, the method may include training the at least one of the machine-learning models based on real-world position data associated with ground truth data. Ground truth data may include evaluated links associated with the real-world position data and travel time, respective match distance, respective heading difference, respective speed conformity, respective average curvature, respective functional class, or respective travel distance versus time delay.

In operation 415, method 400 using at least one of the machine-learning models to calculate a transition score between neighboring link candidates of the link candidates of the one or more combinations of probability scores for respective link candidates. In some cases, the machine-learning model scores each transition based on transition weighting set by transition training data. In some case, the transition weighting are associated with a transition that shares a node, a transition that does not share a node, and a transition on a same link. For example, the machine-learning model may determine that score certain transitions between neighboring link candidates a higher score when they are closer together as opposed to other transitions that are either further away, or would result in an unnatural routing of the vehicle (e.g., would require the vehicle to do a U-turn).

In operation 420, method 400 uses at least one of the machine-learning models to calculate a probability score for each link candidate of the plurality of link candidates of each location data point based on the transition score. In some cases, the at least one of the machine-learning models calculates the probability scores using matrix multiplication. In some cases, the machine-learning model may score each link candidates based on weighting set by training data.

In some case, the weighting associated with at least one of travel time, match distance, heading difference, speed conformity, road curvature, road classification, or travel distance versus time delay. For example, travel time may influence weighting, with the travel time being associated with a speed category and a length of the link, favoring shorter durations. Match distance, being the distance between the sample and the projected point on the link, may also influence the weighting. Heading difference that measures alignment between the sample's heading and the link's direction may also influence the weighting. Speed alignment that compares the sample's speed with the speed limit of the link may also influence the weighting. Curvature and functional class may also prioritize straighter paths and accounts for the road classification and may also influence the weighting. Travel distance/time delay that identifies and mitigates unreasonable travel distances for given timestamps may also influence the weighting.

In operation 425, method 400 calculates total probability scores derived from one or more combinations of reevaluated probability scores for each link candidate, wherein one link candidate may be selected for each location data point. In operation 430, method 400 generates a most probable route based on a highest total probability score.

In some cases, the method includes sending instructions to change a user score based on the most probable route that indicates that that an associated driver moved in an illegal manner. For example, the most probably route may indicate the user must have sped over the speed limit or made an illegal turn. As such, a user score may be impacted by such illegal actions.

In some cases, the method includes removing one or more link candidates from the plurality of link candidates that are associated with a speed less than a threshold speed amount. For example, if the speed is less than 5 miles per hour, then it may be associated with arriving at a destination that may results in parking the vehicle, which may affect the heading of the vehicle. As such, changing of such heading may result in undesirable predictions of the route. In some cases, the method includes removing one or more link candidates from the plurality of link candidates that are associated with a direction that does not match with neighboring link candidates. The direction of a vehicle is not likely to change immediately and therefore the link candidates associated with a different direction would not be suitable candidates.

Figure 5:
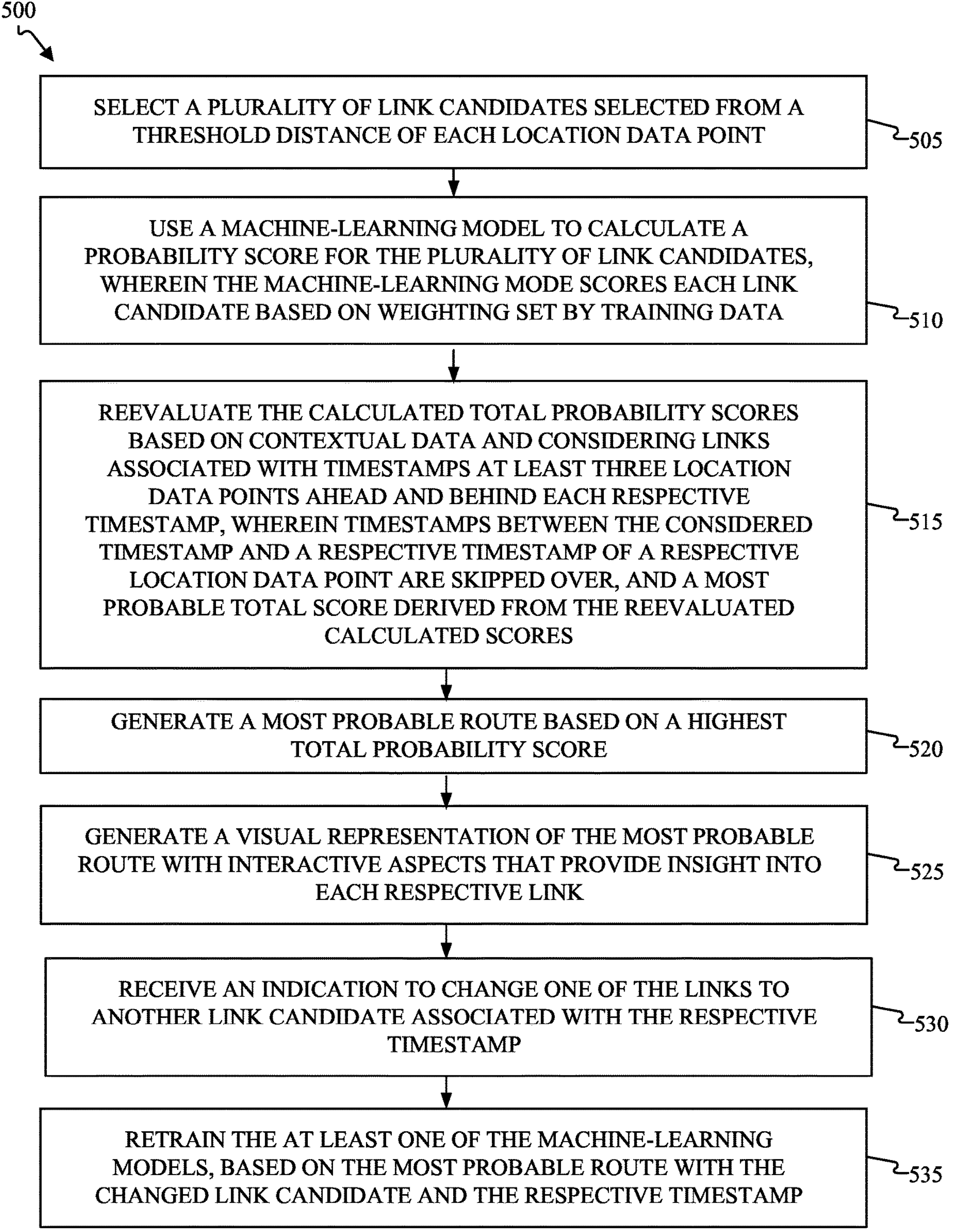
FIG. 5 illustrates example operations for reevaluating calculated probability scores for a most probably route, in accordance with some aspects of the present technology.

FIG. 5 illustrates example method for reevaluating calculated probability scores for a most probably route, which can be performed by any of the systems 100-300 and/or network environment 300.

In operation 505, method 500 selects a plurality of link candidates selected from a threshold distance of each location data point. In operation 510, method 500 using a machine-learning model to calculate a probability score for the plurality of link candidates, wherein the machine-learning model scores each link candidates based on weighting set by training data, wherein the weighting associated with at least one of travel time, match distance, heading difference, speed conformity, road curvature, road classification, or travel distance versus time delay.

In operation 515, method 500 reevaluates the calculated total probability scores based on contextual data and considering links associated with timestamps at least three location data points ahead and behind each respective timestamp, wherein timestamps between the considered timestamp and a respective timestamp of a respective location data point are skipped over, and a most probable route may be derived from the reevaluated calculated scores.

In operation 520, method 500 determines a most probable route based on a highest total probability score. In operation 525, method 500 generates a visual representation of the most probable route with interactive aspects that provide insight into each respective link. In operation 530, method 500 receives an indication to change one of the links to another link candidate associated with the respective timestamp. For example, a user may review the most probable route and select an alternative path. Based on such selection, in operation 535, method 500 includes retraining the at least one of the machine-learning models based on the most probable route with the changed link candidate and the respective timestamp.

It is to be understood that the specific order or hierarchy of operations in the methods depicted in FIGS. 4-5 and throughout this disclosure are instances of example approaches and can be rearranged while remaining within the disclosed subject matter. For instance, any of the operations depicted in FIGS. 4-5 may be omitted, repeated, performed in parallel, performed in a different order, and/or combined with any other of the operations depicted in FIGS. 4-5 or discussed herein.

Figure 6:
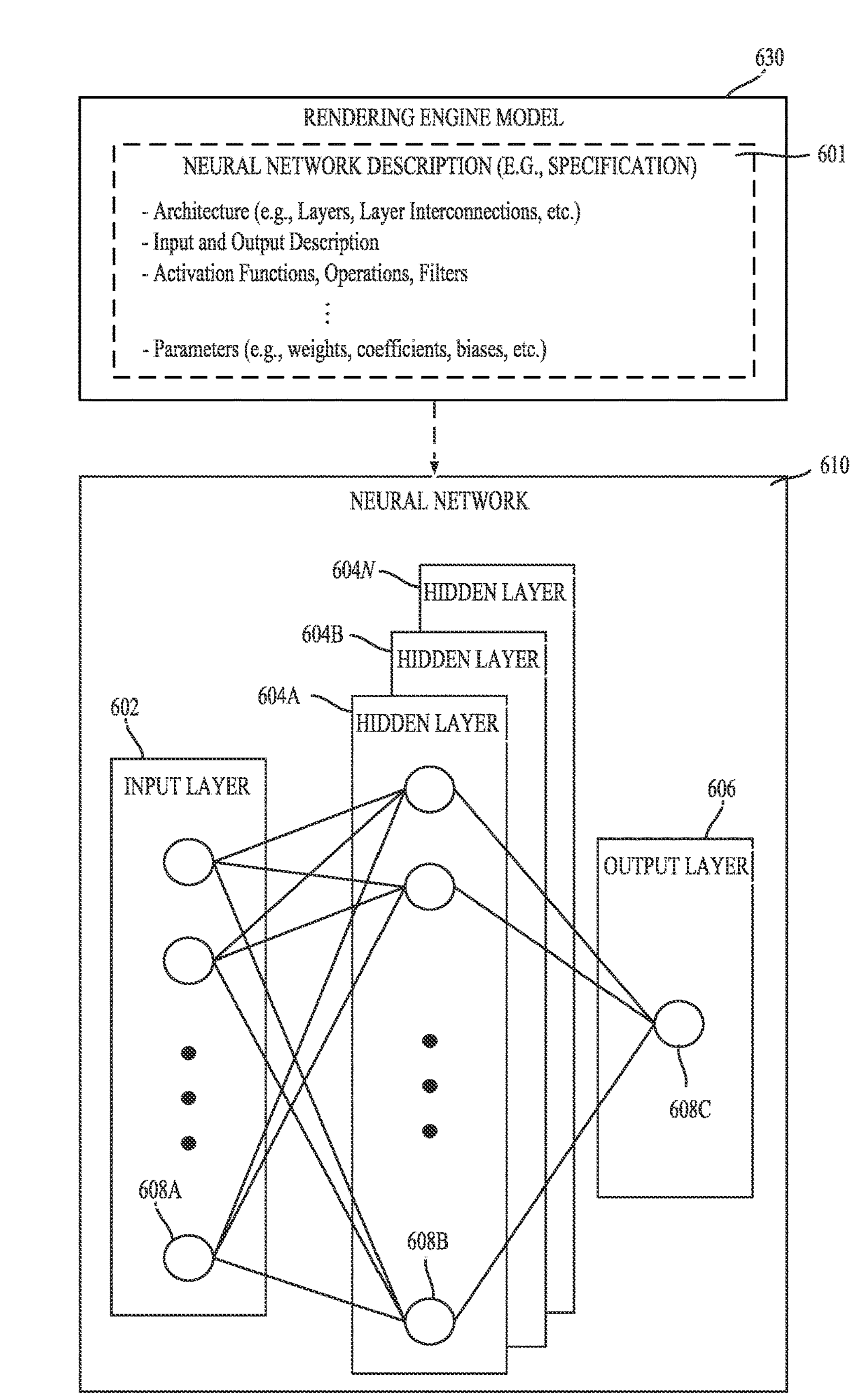
FIG. 6 illustrates an example neural network architecture in accordance with some aspects of the present technology.

FIG. 6 illustrates an example neural network architecture, in accordance with some aspects of the present technology. Architecture 600 includes a neural network 610 defined by an example neural network description 601 in rendering engine model (neural controller) 630. An example of a neural network 610 is the collision prediction CNN. Each neural network 610/collision prediction CNN may be associated with a particular type of impact or may have other neural network outputs associated with particular types of impact as the inputs. The neural network 610 can represent a neural network implementation of a rendering engine for rendering media data.

The neural network description 601 can include a full specification of the neural network 610, including the neural network architecture 600. For example, the neural network description 601 can include a description or specification of the architecture 600 of the neural network 610 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 610 reflects the architecture 600 defined in the neural network description 601. In this example, the neural network 610 includes an input layer 602, which includes input data, such as kinematic variables including at least one of global positioning system (GPS) speed variables, GPS altitude variables, and accelerometer magnitude variables. In one illustrative example, the input layer 602 can include data representing a portion of the input media data such as a patch of data or pixels (e.g., a 128×128 patch of data) in an image corresponding to the input media data.

The neural network 610 includes hidden layers 604A through 604N (collectively "604" hereinafter). The hidden layers 604 can include n number of hidden layers, where n is an integer greater than or equal to one. The number of hidden layers can include as many layers as needed for a desired processing outcome and/or rendering intent. The neural network 610 further includes an output layer 606 that provides an output (e.g., paths that are outputted to a trained planning algorithm) resulting from the processing performed by the hidden layers 604. In one illustrative example, the output layer 606 can provide paths that are most likely to occur and a path that is considered an object collision path.

The neural network 610 in this example is a multi-layer neural network of interconnected nodes. Each node can represent a piece of information. Information associated with the nodes is shared among the different layers and each layer retains information as information is processed. In some cases, the neural network 610 can include a feed-forward neural network, in which case there are no feedback connections where outputs of the neural network are fed back into itself. In other cases, the neural network 610 can include a recurrent neural network, which can have loops that allow information to be carried across nodes while reading in input.

Information can be exchanged between nodes through node-to-node interconnections between the various layers. Nodes of the input layer 602 can activate a set of nodes in the first hidden layer 604A. For example, as shown, each of the input nodes of the input layer 602 is connected to each of the nodes of the first hidden layer 604A. The nodes of the hidden layer 604A can transform the information of each input node by applying activation functions to the information. The information derived from the transformation can then be passed to and can activate the nodes of the next hidden layer (e.g., 604B), which can perform their own designated functions. Example functions include convolutional, up-sampling, data transformation, pooling, and/or any other suitable functions.

The output of the hidden layer (e.g., 604B) can then activate nodes of the next hidden layer (e.g., 604N), and so on. The output of the last hidden layer can activate one or more nodes of the output layer 606, at which point an output is provided. In some cases, while nodes (e.g., nodes 608A, 608B, 608C) in the neural network 610 are shown as having multiple output lines, a node has a single output and all lines shown as being output from a node represent the same output value.

In some cases, each node or interconnection between nodes can have a weight that is a set of parameters derived from training the neural network 610. For example, an interconnection between nodes can represent a piece of information learned about the interconnected nodes. The interconnection can have a numeric weight that can be tuned (e.g., based on a training dataset), allowing the neural network 610 to be adaptive to inputs and able to learn as more data is processed.

The neural network 610 can be pre-trained to process the features from the data in the input layer 602 using the different hidden layers 604 in order to provide the output through the output layer 606. In an example in which the neural network 610 is used to output a prediction that the movement is not association with the first type of impact when the first prediction score is below a threshold score, the neural network 610 can be trained using training data that includes datasets from counterfactual collisions where movement was not associated with a first type of impact and actual historical instances associated with the first type of impact. For instance, training images can be input into the neural network 610, which can be processed by the neural network 610 to generate outputs which can be used to tune one or more aspects of the neural network 610, such as weights, biases, etc.

In some cases, the neural network 610 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 610, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 610 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 610 can perform a backward pass by determining which inputs (weights) most contributed to the loss of the neural network 610, and can adjust the weights so that the loss decreases and is eventually minimized.

A derivative of the loss with respect to the weights can be computed to determine the weights that contributed most to the loss of the neural network 610. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 610 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 610 can represent any other neural or deep learning network, such as an autoencoder, a deep belief nets (DBNs), a recurrent neural networks (RNNs), etc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Furthermore, any term of degree such as, but not limited to, "substantially," as used in the description and the appended claims, should be understood to include an exact, or a similar, but not exact configuration. Similarly, the terms "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees.

Lastly, the terms "or" and "and/or," as used herein, are to be interpreted as inclusive or meaning any one or any combination. Therefore, "A, B, or C" or "A, B, and/or C" mean any of the following: "A," "B," or "C"; "A and B"; "A and C"; "B and C"; "A, B and C." An exception to this definition will occur only when a combination of elements, functions, steps or acts are in some way inherently mutually exclusive.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A system comprising:

one or more processors;

one or more machine-learning models of a map routing matching system; and one or more memory units storing computer-executable instructions, which when executed by the one or more processors, cause the system to:

receive a sequence of location data points associated with respective timestamps of a moving object;

identify a plurality of link candidates selected from a threshold distance of each location data point;

use the one or more machine-learning models to calculate a probability score for each link candidate of the plurality of link candidates of each location data point, wherein the one or more machine-learning models scores each link candidate based on weighting set by training data;

calculate a total probability score derived from one or more combinations of the probability scores for plurality of link candidates, wherein one link candidate is selected for each location data point;

reevaluate the calculated total probability scores based on contextual data and considering links associated with timestamps at least three location data points ahead and behind each respective timestamp; and generate a most probable route based on a highest total probability score;

wherein timestamps between the considered timestamp and a respective timestamp of a respective location data point are skipped over, and the most probable route is derived from the reevaluated calculated scores.

2. The system of claim 1, wherein the one or more processors further cause the system to:

train the at least one of the machine-learning models based on real-world position data associated with ground truth data including evaluated links associated with the real-world position data and at least one of respective travel time, respective match distance, respective heading difference, respective speed conformity, respective average curvature, respective functional class, or respective travel distance versus time delay.

3. The system of claim 1, wherein the one or more processors further cause the system to:

use at least one of the machine-learning models to calculate a transition score between neighboring link candidates of the respective link candidates, wherein each transition is scored based on transition weighting set by transition training data, wherein the transition weighting is associated with a transition that shares a node, a transition that does not share a node, or a transition on a same link.

4. The system of claim 1, wherein the one or more processors further cause the system to: send instructions to change a user score based on the most probable route that indicates that that an associated driver moved in an illegal manner.

5. The system of claim 1, wherein the one or more processors further cause the system to: generate a visual representation of the most probable route with interactive aspects that provide insight into each respective link;

receive an indication to change one of the respective links to another link candidate associated with the respective timestamp; and retrain the at least one of the machine-learning models, based on the most probable route with the changed link candidate and the respective timestamp.

6. The system of claim 1, wherein the one or more processors further cause the system to: remove one or more link candidates from the plurality of link candidates that are associated with a speed less than a threshold speed amount.

7. The system of claim 1, wherein the one or more processors further cause the system to:

remove one or more link candidates from the plurality of link candidates that are associated with a direction that does not match with neighboring link candidates.

8. The system of claim 7, wherein the at least one of the machine-learning models calculates the probability scores using matrix multiplication.

9. A method comprising:

receiving a sequence of location data points associated with respective timestamps of a moving object;

selecting a plurality of link candidates from a threshold distance of each respective location data point;

using a machine-learning model to calculate a probability score for each link candidate of the plurality of link candidates of each location data point, wherein the machine-learning model scores each link candidate based on weighting set by training data;

reevaluating the calculated probability scores for each link candidate based on contextual data and considering links associated with timestamps at least three location data points ahead and behind each respective timestamp, wherein timestamps between the considered timestamp and a respective timestamp of a respective location data point are skipped over;

calculate a total probability score derived from one or more combinations of probability scores for each link candidate, wherein one link candidate is selected for each location data point; and generating a most probable route based the reevaluated calculated scores.

10. The method of claim 9, further comprising:

training the machine-learning model based on real-world position data associated with ground truth data including evaluated links associated with the real-world position data and at least one of respective travel time, respective match distance, respective heading difference, respective speed conformity, respective average curvature, respective functional class, or respective travel distance versus time delay.

11. The method of claim 9, further comprising:

using the machine-learning model to calculate a transition score between neighboring link candidates of the link candidates of the one or more combinations of probability scores for respective link candidates.

12. The method of claim 11, wherein the machine-learning model scores each transition based on transition weighting set by transition training data, wherein the transition weighting is associated with a transition that shares a node, a transition that does not share a node, or a transition on a same link.

13. The method of claim 9, further comprising:

generating a visual representation of the most probable route with interactive aspects that provide insight into each respective link; and receiving an indication to change one of the links to another link candidate associated with the respective timestamp.

14. The method of claim 13, further comprising:

retraining the machine-learning model, based on the most probable route with the changed link candidate and the respective timestamp.

15. The method of claim 9, wherein the weighting is associated with at least one of travel time, match distance, heading difference, speed conformity, road curvature, road classification, or travel distance versus time delay.

16. One or more tangible non-transitory computer-readable storage media storing computer-executable instructions for performing a computer process on a computing system, the computer process comprising:

receiving a sequence of location data points associated with respective timestamps of a moving object;

selecting a plurality of link candidates selected from a threshold distance of each location data point;

using a machine-learning model to calculate a probability score for each link candidate of the plurality of link candidates of each location data point, wherein the machine-learning model scores each link candidate based on weighting set by training data, wherein the weighting associated with at least one of travel time, match distance, heading difference, speed conformity, road curvature, road classification, or travel distance versus time delay;

reevaluating the calculated total probability scores based on contextual data and considering links associated with timestamps at least three location data points ahead and behind each respective timestamp;

calculating a total probability score derived from one or more combinations of reevaluated probability scores for each link candidate, wherein one link candidate is selected for each location data point;

generating a most probable route based on a highest total probability score;

generating a visual representation of the most probable route with interactive aspects that provide insight into each respective link;

receiving an indication to change one of the links to another link candidate associated with the respective timestamp; and retraining the at least one of the machine-learning models, based on the most probable route with the changed link candidate and the respective timestamp.

17. The one or more tangible non-transitory computer-readable storage media of claim 16, the computer process further comprising:

training the machine-learning model based on real-world position data associated with ground truth data including evaluated links associated with the real-world position data and at least one of respective travel time, respective match distance, respective heading difference, respective speed conformity, respective average curvature, respective functional class, or respective travel distance versus time delay.

18. The one or more tangible non-transitory computer-readable storage media of claim 17, wherein the location data points are based on respective vehicle movement data captured from one or more telematics sensors.

* * * * *